United States Patent
Luczak

(10) Patent No.: US 10,590,798 B2
(45) Date of Patent: Mar. 17, 2020

(54) NON-INTEGRAL BLADE AND PLATFORM SEGMENT FOR ROTOR

(71) Applicant: United Technologies Corporation, Hartford, CT (US)

(72) Inventor: Blake Luczak, Pittsburgh, PA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1234 days.

(21) Appl. No.: 14/771,580

(22) PCT Filed: Mar. 19, 2014

(86) PCT No.: PCT/US2014/031174
§ 371 (c)(1),
(2) Date: Aug. 31, 2015

(87) PCT Pub. No.: WO2014/197105
PCT Pub. Date: Dec. 11, 2014

(65) Prior Publication Data
US 2016/0376920 A1 Dec. 29, 2016

Related U.S. Application Data

(60) Provisional application No. 61/804,821, filed on Mar. 25, 2013.

(51) Int. Cl.
*F01D 25/06* (2006.01)
*F01D 5/30* (2006.01)
(Continued)

(52) U.S. Cl.
CPC ............... *F01D 25/06* (2013.01); *F01D 5/26* (2013.01); *F01D 5/3015* (2013.01);
(Continued)

(58) Field of Classification Search
CPC .......... F01D 11/008; F01D 25/06; F01D 5/26; F01D 5/3015; F01D 5/3084; F01D 5/147;
(Continued)

(56) References Cited

U.S. PATENT DOCUMENTS 4,650,399 A   3/1987   Craig et al.
5,222,865 A   6/1993   Corsmeier
(Continued)

FOREIGN PATENT DOCUMENTS

EP   1124038   8/2001
EP   1852572   11/2007

OTHER PUBLICATIONS

European Search Report for European Patent Application No. 14807568 completed Nov. 17, 2016.
(Continued)

*Primary Examiner* — Mary Davis
*Assistant Examiner* — Paul W Thiede
(74) *Attorney, Agent, or Firm* — Carlson, Gaskey & Olds, P.C.

(57) ABSTRACT

A rotor includes a rotor hub, a plurality of blades mounted in a circumferentially-spaced arrangement on the rotor hub and a plurality of platform segments circumferentially arranged, respectively, between neighboring ones of the blades. The platform segments include core gas-path defining surfaces and are mounted with a freedom to circumferentially move relative to the neighboring ones of the blades.

13 Claims, 3 Drawing Sheets

(51) Int. Cl.
*F01D 11/00* (2006.01)
*F01D 5/26* (2006.01)

(52) U.S. Cl.
CPC .......... *F01D 5/3084* (2013.01); *F01D 11/008* (2013.01); *F05D 2220/32* (2013.01); *F05D 2260/96* (2013.01); *Y02T 50/672* (2013.01)

(58) Field of Classification Search
CPC . F05D 2220/32; F05D 2260/96; Y02T 50/672
USPC ............................... 416/1, 193 A; 415/173.7
See application file for complete search history.

(56) References Cited

U.S. PATENT DOCUMENTS

| | | |
|---|---|---|
| 5,466,125 A | 11/1995 | Knott |
| 6,280,550 B1 | 8/2001 | Steibel et al. |
| 6,464,456 B2 | 10/2002 | Darolia et al. |
| 6,514,046 B1 | 2/2003 | Morrison et al. |
| 6,648,597 B1 | 11/2003 | Widrig et al. |
| 6,884,028 B2 * | 4/2005 | Brauer .................. F01D 5/3015 415/173.7 |
| 7,258,530 B2 | 8/2007 | Morrison et al. |
| 7,753,643 B2 | 7/2010 | Gonzalez et al. |
| 8,251,651 B2 | 8/2012 | Propheter-Hinckley et al. |
| 2007/0122266 A1 | 5/2007 | Cairo et al. |
| 2008/0226457 A1 | 9/2008 | Belmonte |
| 2009/0010762 A1 | 1/2009 | Caucheteux et al. |
| 2010/0124502 A1 | 5/2010 | Braandl et al. |
| 2011/0176921 A1 | 7/2011 | Gignoux et al. |
| 2012/0163986 A1 * | 6/2012 | Darkins, Jr. ............ F01D 5/282 416/241 B |
| 2013/0004326 A1 * | 1/2013 | McCaffrey ............... F01D 5/147 416/241 B |

OTHER PUBLICATIONS

International Search Report and Written Opinion for PCT Application No. PCT/US2014/031174, dated Dec. 24, 2014.
International Preliminary Report on Patentability for PCT Application No. PCT/US2014/031174 dated Oct. 8, 2015.

* cited by examiner

NON-INTEGRAL BLADE AND PLATFORM SEGMENT FOR ROTOR

STATEMENT REGARDING FEDERALLY SPONSORED RESEARCH OR DEVELOPMENT

This invention was made with government support under contract number FA8605-05-D-5806 awarded by the United States Air Force. The government has certain rights in the invention.

BACKGROUND

This disclosure relates to a rotor with composite blades and, more particularly, to non-integral blades and platforms.

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and, optionally, a fan section. The compressor section typically includes low and high pressure compressors, and the turbine section includes low and high pressure turbines.

Typically, turbine blades in an engine are fabricated from high strength alloys, with integral airfoils, roots and platforms. Some turbine blades use ceramic matrix composite (CMC) materials. However, the use of the CMC material often requires relatively complex design modifications that can negate the benefits of using the CMC material.

SUMMARY

A rotor according to an example of the present disclosure includes a rotor hub, a plurality of blades mounted in a circumferentially-spaced arrangement on the rotor hub, and a plurality of platform segments circumferentially arranged, respectively, between neighboring ones of the plurality of blades. The plurality of platform segments includes core gas-path defining surfaces. Each of the plurality of platform segments is mounted with a freedom to circumferentially move relative to the respective neighboring ones of the plurality of blades.

In a further embodiment of any of the foregoing embodiments, the plurality of platform segments include non-gas path defining surfaces disposed opposite from the core gas-path defining surfaces, and hooks projecting from the non-gas path defining surfaces.

In a further embodiment of any of the foregoing embodiments, the hooks interlock with corresponding hooks of attachment members that are secured to the rotor hub.

In a further embodiment of any of the foregoing embodiments, the attachment members engage radially inwardly facing surfaces of the rotor hub with respect to a rotational axis of the rotor hub.

In a further embodiment of any of the foregoing embodiments, the radially inwardly facing surfaces of the rotor hub are located radially inwards of a plurality of slots in which the plurality of blades are mounted.

In a further embodiment of any of the foregoing embodiments, each of the plurality of platform segments includes two axially-spaced apart hooks.

In a further embodiment of any of the foregoing embodiments, the two axially-spaced apart hooks are radially offset from one another.

In a further embodiment of any of the foregoing embodiments, one of the two axially-spaced apart hooks is interlocked with a corresponding hook of an attachment member that is secured to the rotor hub, and the other of the two axially-spaced apart hooks engages a radially inwardly facing surface of the rotor hub with respect to a rotational axis of the rotor hub.

In a further embodiment of any of the foregoing embodiments, there is a circumferential gap between each of the plurality of platform segments and at least one of the respective neighboring ones of the plurality of blades.

In a further embodiment of any of the foregoing embodiments, the plurality of blades include respective ceramic airfoil bodies.

In a further embodiment of any of the foregoing embodiments, the ceramic airfoil bodies have a first composition and the plurality of platform segments have a second composition that differs from the first composition in chemical formulation.

In a further embodiment of any of the foregoing embodiments, the second composition is metallic.

In a further embodiment of any of the foregoing embodiments, the plurality of platform segments include respective ceramic platform bodies.

In a further embodiment of any of the foregoing embodiments, the plurality of platform segments include, respectively, pockets disposed opposite from the core gas-path defining surfaces, and further comprising damper members located, respectively, in the pockets.

In a further embodiment of any of the foregoing embodiments, the plurality of blades includes, respectively, serrated root portions received in corresponding slots the rotor hub.

A blade adapted for mounting to a rotor according to an example of the present disclosure includes a non-segmented ceramic blade body extending between a leading edge and a trailing edge and a first side and a second side that join the leading edge and the trailing edge. The ceramic blade body includes a free, tip end and an opposed mounting end that includes a serrated root.

In a further embodiment of any of the foregoing embodiments, the non-segmented ceramic blade body is a ceramic matrix, fiber-reinforced material.

In a further embodiment of any of the foregoing embodiments, further comprises a platform segment configured to be non-rigidly mounted adjacent one of the first side or the second side.

A method of damping in a rotor according to an example of the present disclosure includes providing a rotor hub, a plurality of blades mounted in a circumferentially-spaced arrangement on the rotor hub and a plurality of platform segments circumferentially arranged, respectively, between neighboring ones of the plurality of blades. Each of the plurality of platform segments includes, respectively, core gas-path defining surfaces and damping vibration in the rotor with circumferential movement of the plurality of platform segments relative to the respective neighboring ones of the plurality of blades.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
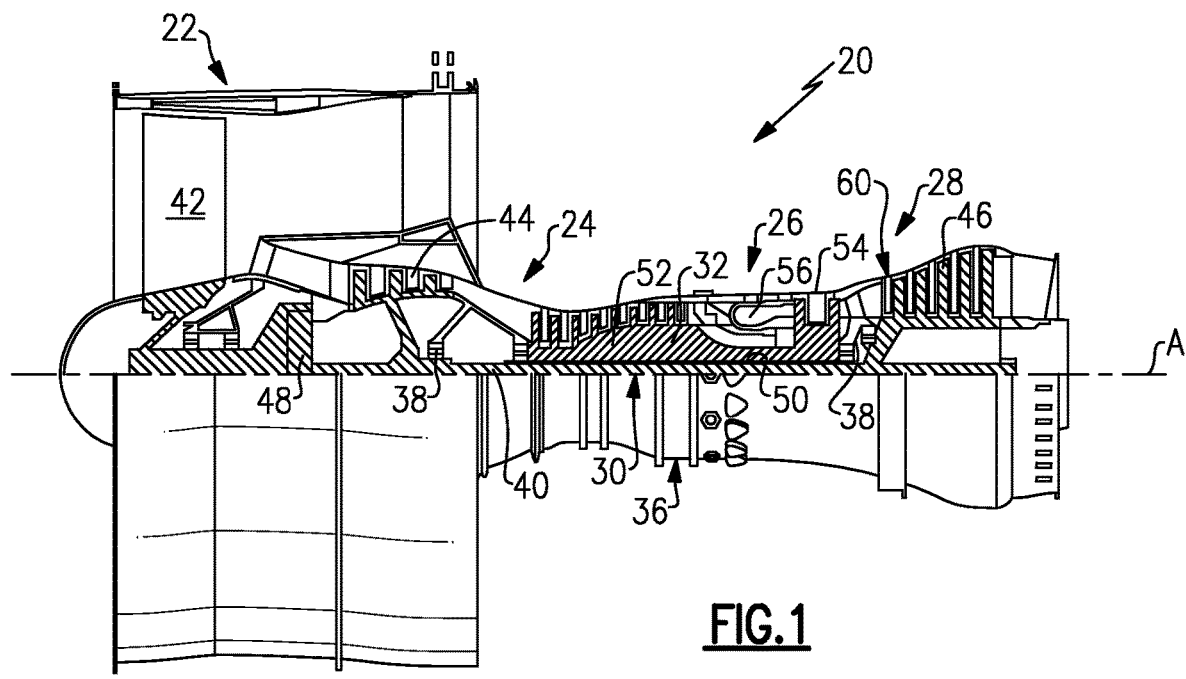
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans and the teachings may be applied to other types of turbine engines, including single-spool architectures, three-spool architectures and ground-based turbines that do not have a fan section.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about five (5). The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ\text{R})/(518.7^\circ\text{R})]^{0.5}$. The "Low corrected fan tip speed" as disclosed herein according to one non-limiting embodiment is less than about 1150 ft/second.

Figure 2:
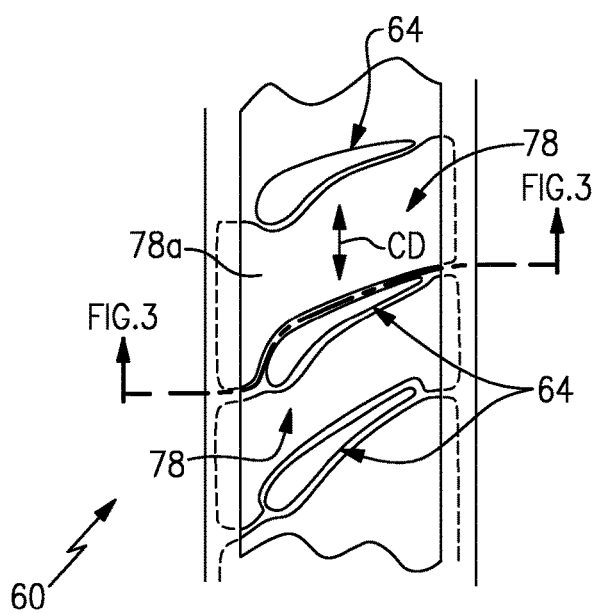
FIG. 2 illustrates a radially inward view of a portion of a rotor of the engine of FIG. 1.
Figure 3:
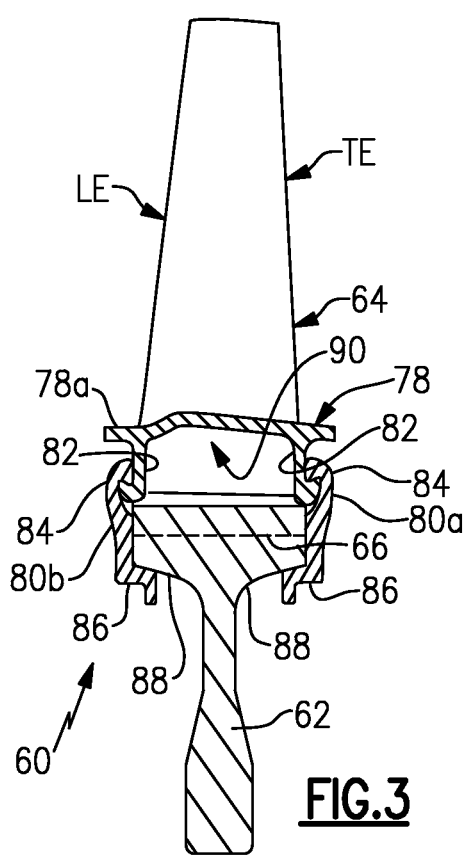
FIG. 3 illustrates a sectioned view of the rotor according to the section line of FIG. 2.

The engine 20 includes a rotor, schematically illustrated at 60 in FIG. 1. FIG. 2 shows a radially inward view of a portion of the rotor 60 and FIG. 3 shows a sectioned view according to the section line in FIG. 2. As can be appreciated, directional terms, such as "radial," "axial," "forward," "aft" or the like are used with reference to the normal structural and operational orientation of the engine 20 and engine central axis A.

The rotor 60 includes a rotor hub 62, which may alternatively be called a rotor disk, and a plurality of blades 64 that are mounted in a circumferentially-spaced arrangement (FIG. 2) on the rotor hub 62. In this example, the blades 64 are mounted in circumferentially-spaced slots 66 in the rotor hub 62.

Figure 4:
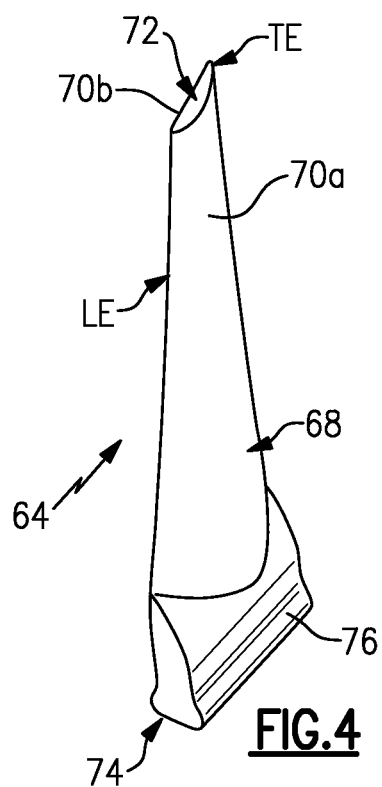
FIG. 4 illustrates an isolated view of a blade of the rotor of FIG. 2.

Referring also to FIG. 4 showing an isolated view of a representative one of the blades 64, each blade 64 includes a non-segmented ceramic blade body 68 that extends between a leading edge, LE, and a trailing edge, TE and a first side 70a and a second side 70b that join the leading edge and the trailing edge. The ceramic blade body 68 includes a free, tip end 72 and an opposed mounting end 74. The mounting end 74 includes a serrated root 76, which may also be referred to as a fir-tree shape that is received into a corresponding one of the slots 66 and the rotor hub 62 to mount the blade 64 in the rotor hub 62.

In a further example, the non-segmented ceramic blade body 68 is a permanent, unified structure that defines the full, fundamental shape of the blade 64 with respect to the leading edge, the trailing edge, the sides 70a/70b, the tip end 72 and the mounting end 74 described above and, thus, does not depend upon conformance to an underlying structure for its shape.

The non-segmented ceramic blade body 68 is made of a ceramic material, such as a ceramic matrix, fiber-reinforced material. For example, a ceramic matrix, fiber-reinforced material has at least one continuous ceramic phase in which fibers are embedded. The ceramic phase(s) and the type(s) of fibers can be selected based on suitability for the end-use design, and the non-segmented ceramic blade body 68 can be either solid or hollow. In general, non-segmented ceramic blade body 68 has a much simpler geometry than a typical metal blade, with a relatively high taper in the airfoil.

In some non-limiting examples, the ceramic phase includes carbides, nitrides, oxides, borides or combinations thereof. The fibers can be ceramic fibers of carbides, nitrides, oxides, borides, carbon fibers, metallic fibers or combinations thereof. The fibers can be continuous, discontinuous, unidirectional, woven, braided, arranged in a two-dimensional network, arranged in a three-dimensional network or provided in other arrangements that may be suitable for the end-use design. Further, although the non-segmented ceramic blade body 68 could have a laminated structure that results from a lay-up fabrication processing technique, such a laminated structure becomes permanently bonded upon densification and is thus not considered to be segmented for purposes of this disclosure.

The rotor 60 further includes a plurality of platform segments 78 that are circumferentially arranged, respectively, between neighboring ones of the blades 64. Each of the platform segments 78 includes a core gas-path defining surface 78a, which bounds and defines a portion of the core flowpath through the engine 20. For example, the entire upper surface of each of the platform segments 78 is directly exposed to the core flow through the engine 20. In this example, the platform segments 78 are contoured with respect to the core gas-path defining surface 78a. Alternatively, the platform segments 78 can have a different contour shape than shown or can be non-contoured.

Figure 6:
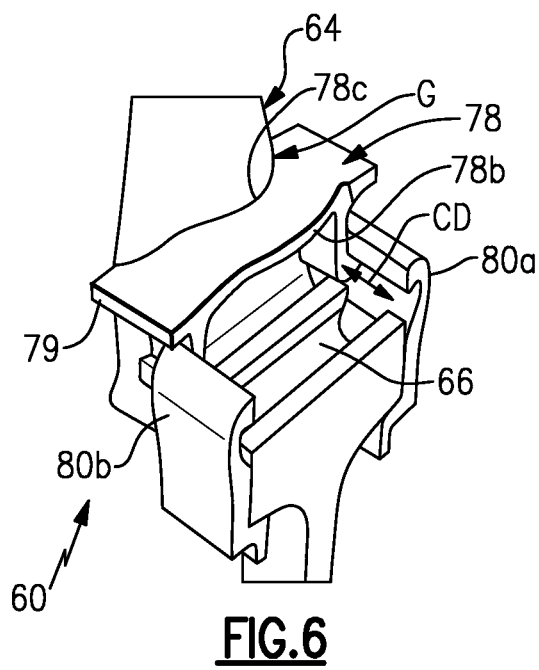
FIG. 6 illustrates a perspective view of a portion of the rotor of FIG. 2, with one of the blades removed.
Figure 5:
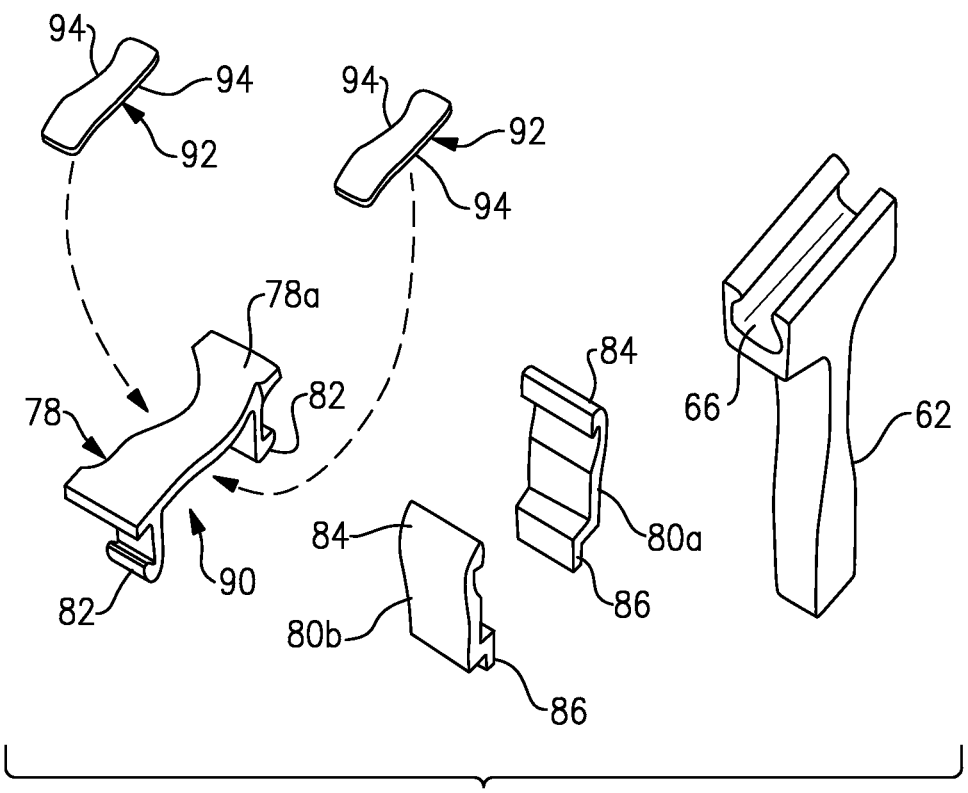
FIG. 5 illustrates an exploded view of selected portions of a rotor.

Referring also to FIG. 5 showing an expanded view of selected portions of the rotor 60 and to FIG. 6 showing a perspective cutaway view of the rotor 60 (with one of the blades removed), the platform segments 78 are mounted in the rotor 60 with a freedom to circumferentially move along circumferential direction, CD (see also FIG. 2), relative to the respective neighboring ones of the blades 64. For example, the platform segments 78 are non-integral with the blades 64. That is, the platform segments 78 are not rigidly attached to the blades 64 and thus are permitted to move circumferentially with respect to the blades 64. The circumferential movement, or play in the circumferential position of the platform segments 78, serves to damp vibration in the rotor 60. For example, friction between the platform segments 78 and any or all of the blades 64, rotor hub 62 and other mating components that will be described below, serves to absorb vibrational energy and thus reduce vibration in the rotor 60.

Figure 7:
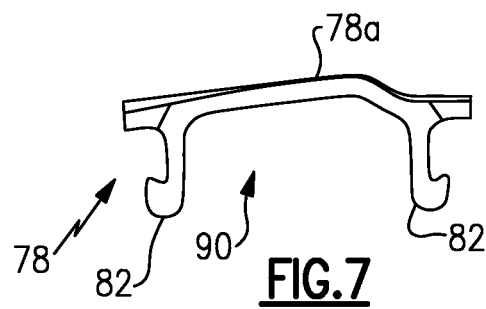
FIG. 7 illustrates a circumferential view of a segmented platform.
Figure 8:
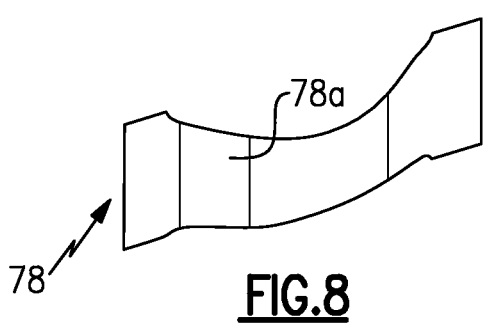
FIG. 8 illustrates a radially inward view of the platform segment of FIG. 7.
Figure 9:
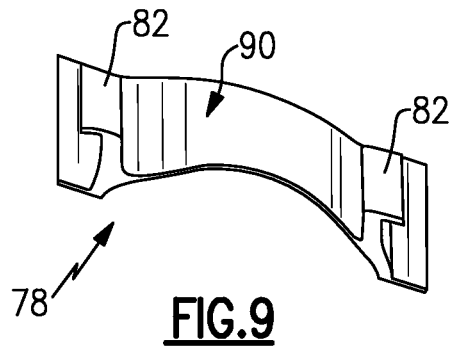
FIG. 9 illustrates a radially outward perspective view of the platform segment of FIG. 7.

In this example, attachment members 80a/80b secure the platform segment 78 to the rotor hub 62. The attachment member 80a is located on the trailing edge side of the platform segment 78 and the attachment member 80b is located at the leading edge side of the platform segment 78. In this regard, each of the platform segments 78 includes one or more hooks 82 that extend in a direction opposite from the core gas-path defining surface 78a. Additional views of a representative one of the platform segments 78 is shown in FIGS. 7, 8 and 9.

In this example, the platform segment 78 has two such hooks 82 that are axially spaced apart. The hooks 82 interlock with corresponding hooks 84 on the respective attachment members 80a/80b. In this example, each of the attachment members 80a/80b extends radially inwardly and has another hook 86 that engages a radially inwardly facing surface 88 on the rotor hub 62. The radially inwardly facing surface 88 of the rotor hub 62 is located radially inwardly of the slots 66, for example. Thus, the attachment members 80a/80b clamp the platform segment 78 to the rotor hub 62. The clamping is non-rigid and limits radial movement of the platform segment 78 but permits circumferential movement.

The platform segments 78 each include a respective platform body 79 that can be a ceramic platform body made of the same ceramic material as the blades 64 or a different ceramic material. Alternatively, the platform body 79 can be made of a non-ceramic material with respect to chemical formulation. In one example, the platform segments 78 are metallic. Alternatively, the platform segments 78 can have a similar chemical formulation to the blades 64, but may differ in the amount or type of fibers or ceramic matrix, for example. Similar to the blade body 68, the platform body 79 is a permanent, unified structure that defines the full, fundamental shape of the platform segment 78 with respect to a forward edge and an aft edge, circumferential sides, and radially inner and outer surfaces and, thus, does not depend upon conformance to an underlying structure for its shape.

One challenge in fabricating a ceramic matrix, fiber-reinforced integral blade is that it is difficult to form the contours of the platform geometry, buttress geometry and fillets while meeting performance requirements, such as strength requirements given pull on the integral blade design. However, by making the platform separate from the blade, as described in the examples herein, the design is simplified and pull on the blade attachment can be reduced. Further, the materials selected for blades 64 and the platform segments 78 can be tailored to the individual requirements of the blades 64 and platform segments 78. The disclosed examples also provide the ability to remove and individually replace the component pieces of the rotor 60. For example, the blades 64 and/or the platform segments 78 can be repaired and replaced independently of each other.

As can be appreciated, the hooks 82 and the upper portion of the platform segment 78 form a pocket 90. If additional damping is desired, one or more damper members 92 can be used within the pocket 90. In one example, a single damper member 92 is used in a single pocket 90, while in other examples, multiple damper members 92 can be used in each pocket 90.

Each of the damper members 92 includes circumferential sides 94. At least one of the circumferential sides 94, and in some cases both circumferential sides 94, bear against the neighboring blades 64. For instance, if a single damper member 92 is used in a pocket 90, the damper member 92 can be sized such that both of the circumferential sides 94 bear against opposed neighboring blades 64. If several damper members 92 are used, only one of the circumferential sides 94 of an individual damper member 92 may bear against one of the neighboring blades 64.

One or more of several features can contribute to permitting or enhancing the circumferential movement of the platform segments 78. In one example, the clamping attachment between the platform segment 78 and the attachment members 80a/80b is non-rigid and thus allows the platform 78 to slide in the circumferential direction CD. To ensure that there is a proper amount of space for this sliding movement, the platform 78 can be sized smaller than the space between the respective neighboring blades 64. For instance, circumferential sides 78b/78c of the platform segment 78 can be contoured to provide a gap, G (FIG. 6), between the platform segment 78 and one of the blades 64. The gap G permits play between the platform segment 78 and the blades 64. Additionally or alternatively to providing the gap, the damper members 92 can be used to provide a spacing between the platform segments 78 and the blades 64. For instance, the circumferential size of the damper members 92 can be larger than the circumferential size of the platform segments 78 such that the circumferential gap between neighboring ones of the blades 64 is larger than the circumferential size of the platform segments 78. This too permits circumferential play in the platform segments 78.

Figure 10:
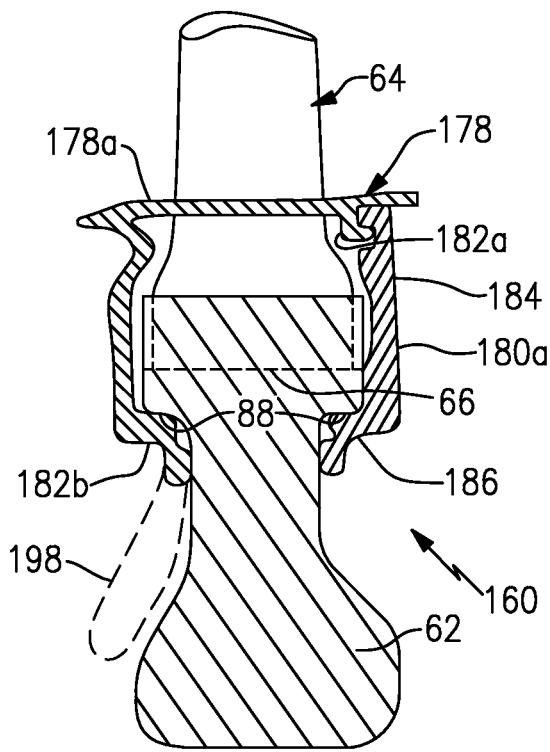
FIG. 10 illustrates another example rotor with a segmented platform and blade.

FIG. 10 shows a portion of another example rotor 160. In this disclosure, like reference numerals designate like elements where appropriate and reference numerals with the addition of one-hundred designate modified elements that are understood to incorporate the same features and benefits of the corresponding elements. In this example, the platform segment 178 is integral with one of the previously described attachment members. In this regard, the platform segment 178 includes hooks 182a/182b. The hook 182a is similar to the hook 82 previously described. However, the hook 182b is radially longer such that, at least with respect to the free ends of the hooks 182a/182b, the hooks 182a/182b are radially offset from one another. The hook 182a interlocks with the hook 184 of attachment member 180a, similar to the interlocking connection between the hook 82 and hook 84 described above. The hook 182b, however, extends radially inwardly and bears against the radially inwardly facing surface 88 of the rotor hub 62. Thus, from the standpoint of the number of pieces in the assembly, the rotor 160 includes fewer pieces because one of the attachment members is integral with the platform segment 78.

Optionally, the hook 182b can include an extension portion, shown in phantom at 198. The extension portion 198 projects radially inwardly from the position at which the hook 182b bears against the radially inwardly facing surface 88. The extension portion 198 provides additional mass on the segmented platform 178 to reduce blade pull.

In assembling the rotor 160, the blade 64 can be assembled from an inner diameter through the segmented platform 178 and then slid into the slot 66 of the rotor hub 62. The attachment member 180a can then be interlocked with the hook 182a to secure the assembly together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotor comprising:
   a rotor hub;
   a plurality of blades mounted in a circumferentially-spaced arrangement on the rotor hub; and
   a plurality of platform segments circumferentially arranged, respectively, between neighboring ones of the plurality of blades, the plurality of platform segments including core gas-path defining surfaces, each of the plurality of platform segments being mounted with a freedom to circumferentially move relative to the respective neighboring ones of the plurality of blades, the plurality of platform segments including non-gas path defining surfaces disposed opposite from the core gas path defining surfaces and hooks projecting from the non-gas path defining surfaces, the hooks interlocking with corresponding hooks of attachment members that are distinct from the rotor hub and that are secured to the rotor hub, the attachment members engaging radially inwardly facing surfaces of the rotor hub with respect to a rotational axis of the rotor hub.

2. The rotor as recited in claim 1, wherein the radially inwardly facing surfaces of the rotor hub are located radially inwards of a plurality of slots in which the plurality of blades are mounted.

3. The rotor as recited in claim 1, wherein each of the plurality of platform segments includes two axially-spaced apart hooks.

4. The rotor as recited in claim 3, wherein the two axially-spaced apart hooks are radially offset from one another.

5. The rotor as recited in claim 4, wherein one of the two axially-spaced apart hooks is interlocked with a corresponding hook of an attachment member that is secured to the rotor hub, and the other of the two axially-spaced apart hooks engages a radially inwardly facing surface of the rotor hub with respect to a rotational axis of the rotor hub.

6. The rotor as recited in claim 1, wherein there is a circumferential gap between each of the plurality of platform segments and at least one of the respective neighboring ones of the plurality of blades.

7. The rotor as recited in claim 1, wherein the plurality of blades include respective ceramic airfoil bodies.

8. The rotor as recited in claim 7, wherein the ceramic airfoil bodies have a first composition and the plurality of platform segments have a second composition that differs from the first composition in chemical formulation.

9. The rotor as recited in claim 8, wherein the second composition is metallic.

10. The rotor as recited in claim 7, wherein the plurality of platform segments include respective ceramic platform bodies.

11. The rotor as recited in claim 1, wherein the plurality of platform segments include, respectively, pockets disposed opposite from the core gas-path defining surfaces, and further comprising damper members located, respectively, in the pockets.

12. The rotor as recited in claim 1, wherein the plurality of blades includes, respectively, serrated root portions received in corresponding slots the rotor hub.

13. A method of damping in a rotor, the method comprising:
   providing a rotor hub, a plurality of blades mounted in a circumferentially-spaced arrangement on the rotor hub and a plurality of platform segments circumferentially arranged, respectively, between neighboring ones of the plurality of blades, each of the plurality of platform segments including, respectively, core gas-path defining surfaces, the plurality of platform segments including non-gas path defining surfaces disposed opposite from the core gas-path defining surfaces and hooks projecting from the non-gas path defining surfaces, the hooks interlocking with corresponding hooks of attachment members that are distinct from the rotor hub and that are secured to the rotor hub, the attachment members engaging radially inwardly facing surfaces of the rotor hub with respect to a rotational axis of the rotor hub; and damping vibration in the rotor with circumferential movement of the plurality of platform segments relative to the respective neighboring ones of the plurality of blades.

\* \* \* \* \*